(12) United States Patent
Maske et al.

(10) Patent No.: US 11,860,592 B2
(45) Date of Patent: Jan. 2, 2024

(54) SYSTEMS AND METHODS FOR TRAINING A REINFORCEMENT LEARNING SYSTEM FOR PALLET ROUTING IN A MANUFACTURING ENVIRONMENT

(71) Applicant: Ford Global Technologies, LLC, Dearborn, MI (US)

(72) Inventors: Harshal Maske, Farmington Hills, MI (US); Devesh Upadhyay, Canton, MI (US); Jim Birley, Bingham Farms, MI (US); Dimitar Petrov Filev, Novi, MI (US); Justin Miller, Berkley, MI (US); Robert Bennett, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 17/558,805

(22) Filed: Dec. 22, 2021

(65) Prior Publication Data
US 2023/0195057 A1  Jun. 22, 2023

(51) Int. Cl.
G05B 13/04 (2006.01)
G05B 13/02 (2006.01)

(52) U.S. Cl.
CPC ....... G05B 13/042 (2013.01); G05B 13/0265 (2013.01)

(58) Field of Classification Search
CPC .............. G05B 13/042; G05B 13/0265; G05B 2219/32334; G05B 19/41895
USPC ......................................................... 700/99
See application file for complete search history.

(56) References Cited

U.S. PATENT DOCUMENTS

| | | | | |
|---|---|---|---|---|
| 4,309,600 A | * | 1/1982 | Perry | B23Q 7/1447 29/33 P |
| 2020/0393820 A1 | | 12/2020 | Lee et al. | |
| 2021/0253352 A1 | * | 8/2021 | Eckman | B65G 1/0485 |
| 2021/0287459 A1 | * | 9/2021 | Cella | G07C 5/0808 |

(Continued)

FOREIGN PATENT DOCUMENTS

CN   112149987   12/2020

OTHER PUBLICATIONS

Li2 "Simulation Analysis of a Deep Reinforcement Learning Approach for Task Selection by Autonomous Material Handling Vehicles" from "Proceedings of the 2018 Winter Simulation Conference" (Year: 2018).*

(Continued)

*Primary Examiner* — Yuhui R Pan
(74) *Attorney, Agent, or Firm* — Burris Law, PLLC

(57) ABSTRACT

A method includes obtaining state information from one or more sensors of a digital twin. The method includes determining an action at the first routing control location based on the state information, where the action includes one of a pallet merging operation and a pallet splitting operation, and determining a consequence state based on the action. The method includes calculating a transient production value based on the consequence state and a transient objective function, calculating a steady state production value based on the consequence state and a steady state objective function, and selectively adjusting one or more reinforcement parameters of the reinforcement learning system based on the transient production value and the steady state production value.

20 Claims, 5 Drawing Sheets

(56) References Cited

U.S. PATENT DOCUMENTS

2022/0163969 A1* 5/2022 Li .................. G05D 1/0217

OTHER PUBLICATIONS

Hofmann, et al., Digital Twin for Assembly Line Supply Strategy Planning: a Case-Study on Reinforcement-Learning in Logistics, Mar. 21, 2020, 9 pages.

Park, et al., Digital Twin and Reinforcement Learning-Based Resilient Production Control for Micro Smart Factory, Applied Sciences, Mar. 26, 2021, 20 pages, vol. 11, 2977, MPDI, Switzerland.

* cited by examiner

SYSTEMS AND METHODS FOR TRAINING A REINFORCEMENT LEARNING SYSTEM FOR PALLET ROUTING IN A MANUFACTURING ENVIRONMENT

FIELD

The present disclosure relates to systems and methods for training a reinforcement learning system for pallet routing in a manufacturing environment.

BACKGROUND

The statements in this section merely provide background information related to the present disclosure and may not constitute prior art.

In a manufacturing environment, semi-finished and finished workpieces may be provided on various pallets that autonomously navigate between a plurality of workstations that perform manufacturing operations. As an example, when approaching or leaving a workstation, a controller may perform a neural network routine (e.g., a deep learning reinforcement routine performed by a reinforcement learning system) to instruct the pallets to autonomously merge or split paths at various predefined locations in the environment to satisfy various time and production constraints of the manufacturing routine. However, training the reinforcement learning system to efficiently control the pallets in a manner to inhibit bottlenecks is a resource intensive and tedious process. These issues with training a reinforcement learning system configured to control pallets in a manufacturing environment, among other issues, are addressed by the present disclosure.

SUMMARY

This section provides a general summary of the disclosure and is not a comprehensive disclosure of its full scope or all of its features.

The present disclosure provides a method for training a reinforcement learning system. The method includes obtaining state information from one or more sensors of a digital twin, where the state information includes a number of a plurality of pallets at a first routing control location of the digital twin during a manufacturing simulation, a type of the plurality of pallets at the first routing control location during the manufacturing simulation, or a combination thereof. The method includes determining an action at the first routing control location based on the state information, where the action includes one of a pallet merging operation and a pallet splitting operation, and determining a consequence state based on the action, where the consequence state includes a consequent number of the plurality of pallets at a consequent routing control location of the digital twin, a type of the plurality of pallets at the consequent routing control location, or a combination thereof. The method includes calculating a transient production value based on the consequence state and a transient objective function, calculating a steady state production value based on the consequence state and a steady state objective function, and selectively adjusting one or more reinforcement parameters of the reinforcement learning system based on the transient production value and the steady state production value.

In one form, the one or more reinforcement parameters include a sensor layout of the one or more sensors, the transient objective function, the steady state objective function, or a combination thereof. In one form, selectively adjusting the one or more reinforcement parameters includes adjusting the sensor layout, and where adjusting the sensor layout further comprises changing a number of the one or more sensors in the digital twin, a placement of the one or more sensors in the digital twin, or a combination thereof. In one form, the method further includes adjusting a threshold transient production value of the transient objective function of the adjusted sensor layout, a threshold steady state production value of the steady state objective function of the adjusted sensor layout, or a combination thereof. In one form, the one or more reinforcement parameters includes the state information, the action, or a combination thereof. In one form, the transient objective function and the steady state objective function are based on a first target production value associated with a first type of pallets from among the plurality of pallets and a second target production value associated with a second type of pallets from among the plurality of pallets. In one form, the transient objective function is based on a ratio between a first number of the first type of pallets and a second number of the second type of pallets located at the consequent routing control location. In one form, the steady state objective function is based on a ratio between a first number of the first type of pallets and a second number of the second type of pallets located between the consequent routing control location and a destination. In one form, the transient objective function and the steady state objective function are based on a production ratio that is indicative of a ratio of the first target production value and a sum of the first target production value and the second target production value.

The present disclosure provides a system for training a reinforcement learning system. The system includes a processor and a nontransitory computer-readable medium including instructions that are executable by the processor. The instructions include obtaining state information from one or more sensors of a digital twin, where the state information includes a number of a plurality of pallets at a first routing control location of the digital twin during a manufacturing simulation, a type of the plurality of pallets at the first routing control location during the manufacturing simulation, or a combination thereof. The instructions include determining an action at the first routing control location based on the state information, where the action includes one of a pallet merging operation and a pallet splitting operation, and determining a consequence state based on the action, where the consequence state includes a consequent number of the plurality of pallets at a consequent routing control location of the digital twin, a type of the plurality of pallets at the consequent routing control location, or a combination thereof. The instructions include calculating a transient production value based on the consequence state and a transient objective function, calculating a steady state production value based on the consequence state and a steady state objective function, selectively adjusting one or more reinforcement parameters of the reinforcement learning system based on the transient production value and the steady state production value, where the transient objective function and the steady state objective function are based on a first target production value associated with a first type of pallets from among the plurality of pallets and a second target production value associated with a second type of pallets from among the plurality of pallets.

In one form, the one or more reinforcement parameters include a sensor layout of the one or more sensors, the transient objective function, the steady state objective function, or a combination thereof. In one form, the instructions for selectively adjusting one or more reinforcement parameters include adjusting the sensor layout, and where adjusting the sensor layout further comprises changing a number of the one or more sensors in the digital twin, a placement of the one or more sensors in the digital twin, or a combination thereof. In one form, the instructions further comprise adjusting a threshold transient production value of the transient objective function of the adjusted sensor layout, a threshold steady state production value of the steady state objective function of the adjusted sensor layout, or a combination thereof. In one form, the one or more reinforcement parameters includes the state information, the action, or a combination thereof. In one form, the transient objective function is based on a ratio between a first number of the first type of pallets and a second number of the second type of pallets located at the consequent routing control location. In one form, the steady state objective function is based on a first number of the first type of pallets and a second number of the second type of pallets located between the consequent routing control location and a destination. In one form, the transient objective function and the steady state objective function are based on a production ratio that is indicative of a ratio of the first target production value and a sum of the first target production value and the second target production value.

The present disclosure provides a method for training a reinforcement learning system. The method includes obtaining state information from one or more sensors of a digital twin, where the state information includes a number of a plurality of pallets at a first routing control location of the digital twin during a manufacturing simulation. The instructions include determining an action at the first routing control location based on the state information, where the action includes one of a pallet merging operation and a pallet splitting operation, and determining a consequence state based on the action, where the consequence state includes a consequent number of the plurality of pallets at a consequent routing control location of the digital twin, a type of the plurality of pallets at the consequent routing control location, or a combination thereof. The instructions include calculating a transient production value based on the consequence state and a transient objective function, calculating a steady state production value based on the consequence state and a steady state objective function, selectively adjusting one or more reinforcement parameters of the reinforcement learning system based on the transient production value and the steady state production value, where the transient objective function and the steady state objective function are based on a first target production value associated with a first type of pallets from among the plurality of pallets and a second target production value associated with a second type of pallets from among the plurality of pallets.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
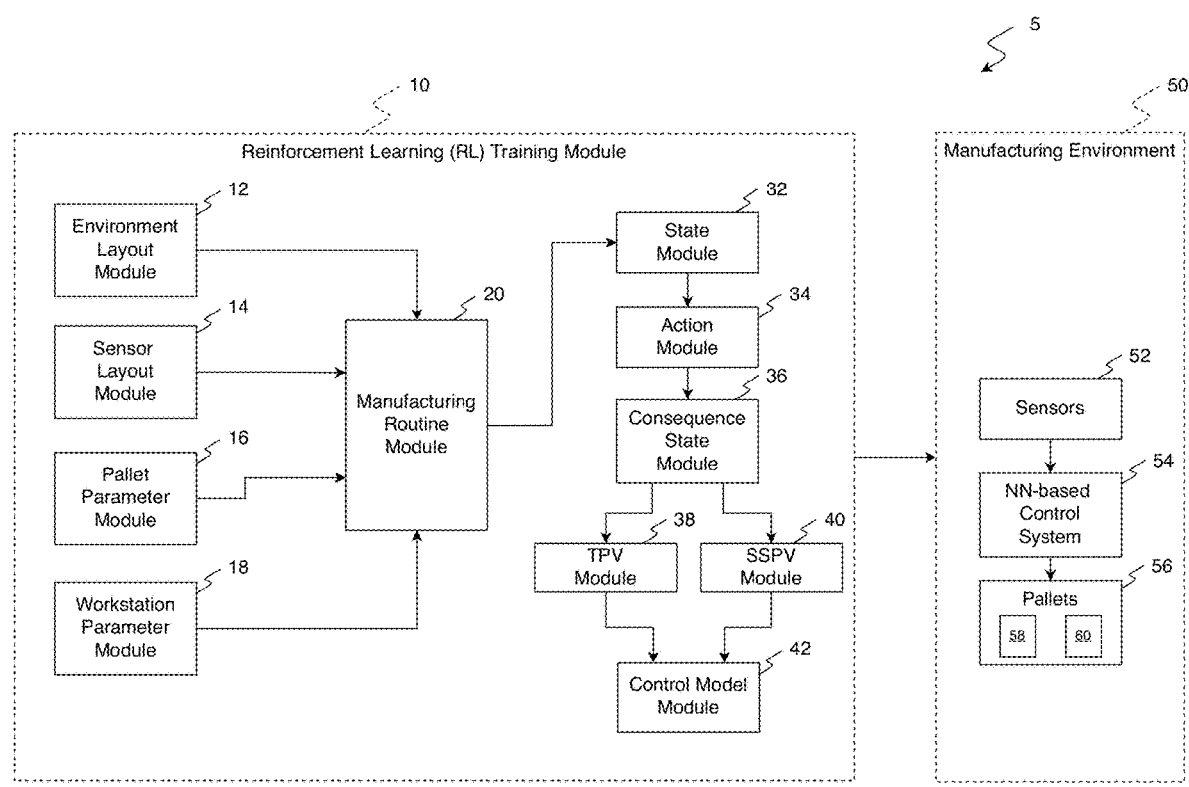
FIG. 1 is a block diagram of a system including a reinforcement learning training module and a manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for training a reinforcement learning system configured to perform autonomous control of the movement of pallets in a manufacturing environment using a digital twin. A reinforcement learning training module simulates a manufacturing routine of a plurality of pallets and workstations and obtains state information from one or more sensors of the digital twin and computes additional state information by calculating pseudo-target states and transient states with respect to one or more routing control locations. The reinforcement learning training module determines an action at various routing control locations of the environment and consequence state information based on the actions performed at the routing control locations. The reinforcement learning training module calculates transient and steady state rewards based on the consequence states and one or more objective functions and selectively adjusts one or more reinforcement parameters of the reinforcement learning system based on the transient and steady state rewards. By selectively adjusting the reinforcement parameters, the reinforcement learning system can autonomously control the movement of the pallets between workstations and inhibit bottlenecks of the manufacturing routine and ensure various production conditions are satisfied.

Referring to FIG. 1, a system 5 for controlling and defining a sensor layout is provided and generally includes a reinforcement learning (RL) training module 10 and a manufacturing environment 50. While the RL training module 10 is positioned remotely from the manufacturing environment 50, it should be understood that the RL training module 10 may be included as part of the manufacturing environment 50 in other forms. In one form, the RL training module 10 and the manufacturing environment 50 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the manufacturing environment 50 includes sensors 52, a neural-network-based (NN-based) control system 54, and pallets 56. In form, the sensors 52 are configured to obtain identification and/or location information associated with the pallets 56 and track the pallets 56 as they traverse the manufacturing environment 50. As an example, the sensors 52 may be radio frequency identification (RFID) scanners configured to scan RFID tags disposed on the pallets 56. As another example, the sensors 52 may be imaging devices (e.g., a two-dimensional (2D) camera or a three-dimensional (3D) camera) configured to obtain images of fiducial markers disposed on the pallets 56 (e.g., quick response (QR) tags that include a unique 2D barcode uniquely identifying the pallets 56). As described below in further detail, the RL training module 10 is configured to define the number and positioning of the sensors 52.

In one form, the pallets 56 are configured to transport raw, semi-finished, and finished workpieces between various workstations/storage areas of the manufacturing environment 50. The pallets 56 may be pallets that are moveable along headrails and conveyors, two-way entry pallets, four-way entry pallets, open deck pallets, solid deck pallets, and/or double face pallets. In one form, the pallets 56 may include fixtures 58 that are configured to support and secure a workpiece thereto.

In one form, the pallets 56 are partially or fully autonomous and are configured to move to various locations within the manufacturing environment 50, as instructed by the NN-based control system 54. To autonomously move itself, the pallets 56 include a control system 60 to control various movement systems (e.g., propulsion systems, steering systems, and/or brake systems) based on one or more navigation sensors (e.g., a global navigation satellite system (GNSS) sensor, an imaging sensor, a local position sensor, among others) of the pallets 56 (not shown). To perform the functionality described herein, the control system 60 may include one or more processor circuits that are configured to execute machine-readable instructions stored in one or more nontransitory computer-readable mediums, such as a random-access memory (RAM) circuit and/or read-only memory (ROM) circuit. The control system 60 may also include other components for performing the operations described herein, such as, but not limited to, movement drivers and systems, transceivers, routers, and/or input/output interface hardware. It should be understood that the pallets 56 may not be autonomous and thus be moveable by a forklift, vehicle, or conveyor/headrail of the manufacturing environment 50 in other forms.

In one form, the NN-based control system 54 is configured to instruct the pallets 56 to autonomously travel to various locations of the manufacturing environment 50 based on the sensor data obtained from the sensors 52 (i.e., the identification and/or location of the pallets 56). In one form, the NN-based control system 54 remotely and autonomously controls the pallets 56 as they travel to a respective location of the manufacturing environment 50 (e.g., controls the merging and splitting of the pallets 56 at various locations within the manufacturing environment 50). To perform the functionality described herein, the NN-based control system 54 may perform a deep reinforcement learning (DRL) routine. Accordingly, the DRL routine is trained based on actions performed by the agents and a reward associated with the action (e.g., whether the various actions of the pallets 56 satisfy one or more time constraints associated with the manufacturing routine). Furthermore, to train the DRL learning routine performed by the NN-based control system 54 (e.g., maximize the rewards of the DRL learning routine), the RL training module 10 may iteratively modify various reinforcement parameters of the RL training module 10, as described below in further detail.

In one form, the RL training module 10 includes an environment layout module 12, a sensor layout module 14, a pallet parameter module 16, a workstation parameter module 18, a manufacturing routine module 20 and a control model module 42. It should be readily understood that any one of the components of the RL training module 10 can be provided at the same location or distributed at different locations (e.g., via one or more edge computing devices) and communicably coupled accordingly. To perform the functionality described herein, the RL training module 10 may include a human-machine-interface (HMI) (e.g., a touchscreen display, monitor, among others) and/or input devices (e.g., mouse, keyboard, among others) that enable an operator to generate inputs corresponding to the described functionality.

In one form, the environment layout module 12 is configured to generate a digital twin of the manufacturing environment 50. As used herein, a "digital twin" may refer to a virtual representation of various components and systems of the manufacturing environment 50, such as one or more workstations (not shown), the pallets 56, the sensors 52, among other components and systems. The virtual representation may be, for example, a dynamic simulation model of the manufacturing environment 50 (e.g., a discrete event simulation model of the manufacturing environment 50). As described below in further detail, the virtual representation may also include historical operation data associated with the components and systems of the manufacturing environment 50 when a manufacturing routine is being simulated by the manufacturing routine module 20.

In one form, the environment layout module 12 is configured to define one or more routing control locations of the digital twin. As used herein, "routing control locations" refer to locations within the digital twin in which virtual pallets perform a pallet merging operation and/or a pallet splitting operation. As used herein, "pallet merging operation" refers to an operation in which one or more first virtual pallets traveling along a first path and one or more additional virtual pallets traveling along one or more additional paths are merged such that at least a set of the first virtual pallets and a set of the additional virtual pallets travel along a new path. As used herein, "pallet splitting operation" refers to an operation in which a plurality of virtual pallets traveling along a path are split such that a first set of the plurality of pallets travels along a first new path and a second set of the plurality of pallets travels along a second new path.

Figure 2:
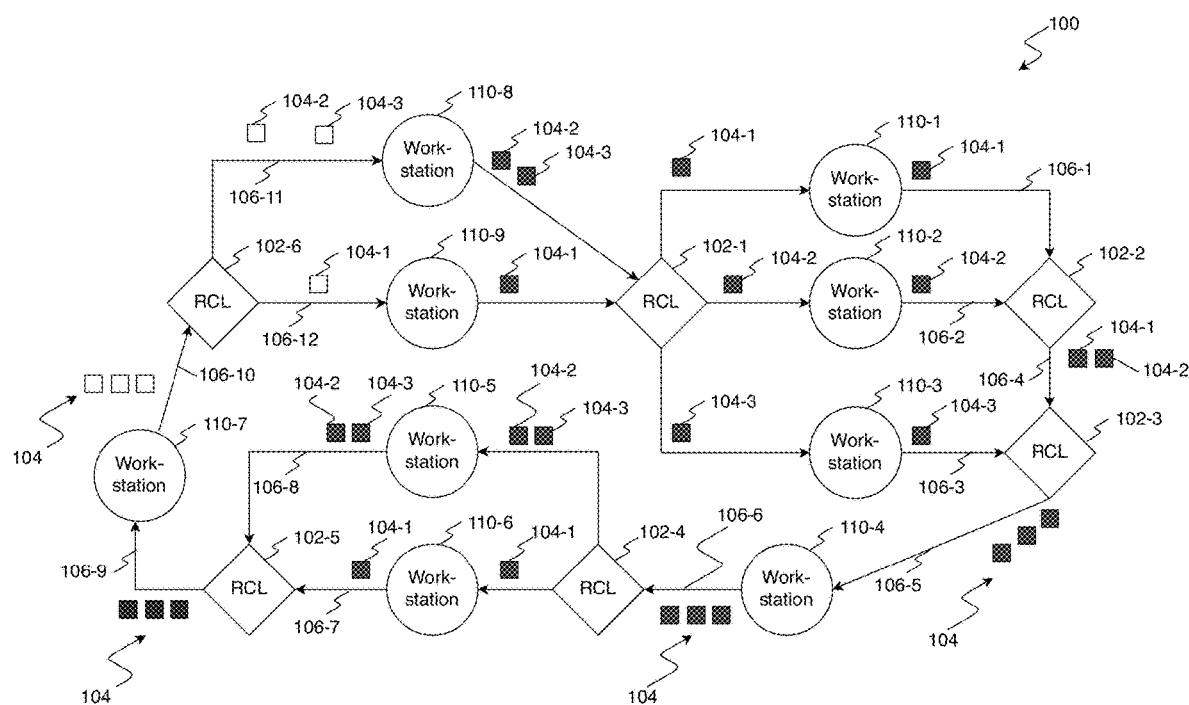
FIG. 2 is a block diagram of a digital twin of a manufacturing environment in accordance with the teachings of the present disclosure.

As an example and referring to FIG. 2, which illustrates a digital twin 100 of the manufacturing environment 50, the environment layout module 12 defines routing control locations 102-1, 102-2, 102-3, 102-4, 102-5, 102-6 (collectively referred to as "routing control locations 102") at which a pallet merging operation and/or pallet splitting operation can be performed. Specifically, a pallet merging operation can be performed at the routing control locations 102-1, 102-2, 102-3, 102-5. For example, pallets 104-1, 104-2 traveling along paths 106-1, 106-2 can be merged at the routing control location 102-2 such that the pallets 104-1, 104-2 travel along path 106-4. Furthermore, a pallet splitting operation can be performed at the routing control locations 102-1, 102-4, 102-6. For example, pallets 104-1, 104-2, 104-3 traveling along paths 106-11, 106-12 can be split at the routing control location 102-1 such that the pallets 104-1, 104-2, 104-3 travel along paths 106-1, 106-2, 106-3, respectively. Additionally, both a pallet merging operation and a pallet splitting operation can be performed at the routing control location 102-1. The pallets 104-1, 104-2, 104-3 may be collectively referred to herein as "pallets 104," and paths 106-1, 106-2, 106-3, 106-4, 106-5, 106-6, 106-7, 106-8, 106-9, 106-10, 106-11, 106-12 may be collectively referred to herein as "paths 106."

Figure 3:
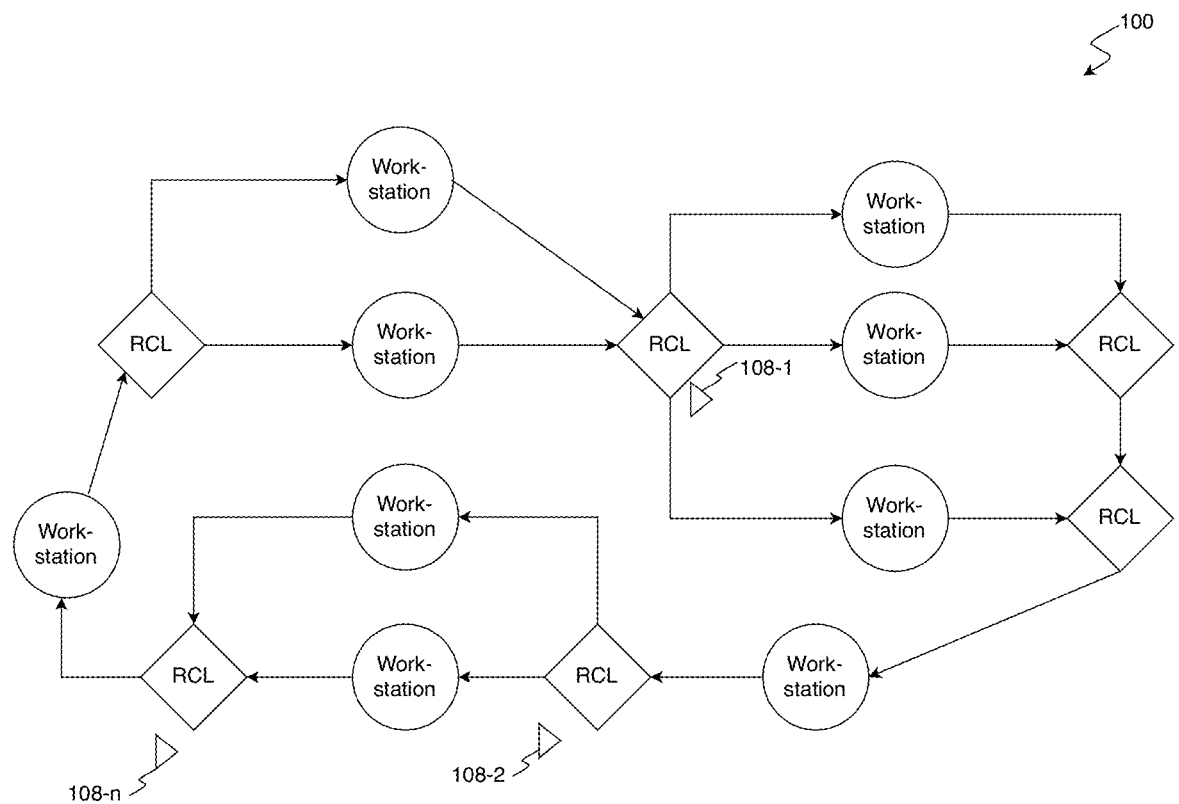
FIG. 3 is a block diagram of a digital twin of a sensor layout of a manufacturing environment in accordance with the teachings of the present disclosure.

In one form and referring to FIGS. 1 and 3, the sensor layout module 14 is configured to define a sensor layout including one or more sensors 108-1, 108-2, . . . 108-$n$ (collectively referred to hereinafter as "sensors 108") of the digital twin 100 based on one or more sensor parameters. In one form, the sensor parameters include a predetermined number of sensors (e.g., a minimum and maximum number of sensors 108 in accordance with resource-based constraints), a type of sensor, sensor placement rules (e.g., the sensors 108 can only be placed at the routing control locations 102), and/or feedback information. As an example, the sensor layout module 14 initially defines the sensor layout such that the minimum number of sensors 108 are placed at one or more of the routing control locations 102 (e.g., the routing control locations 102-1, 102-2, 102-3, 102-4 represent the minimum of sensor locations of the digital twin 100).

In one form, the pallet parameter module 16 is configured to define one or more pallet parameters associated with the pallets 104. The one or more pallet parameters may include a pallet merging time associated with each routing control location 102, a pallet splitting time associated with each routing control location 102, and/or pallet travel times between the routing control locations 104. As used herein, "pallet merging time" refers to an amount of time needed to perform the pallet merging operation, and "pallet splitting time" refers to an amount of time needed to perform the pallet splitting operation. As used herein, "pallet travel time" refers to an amount of time needed for the pallet 104 to travel between a pair of routing control locations 102.

In one form, the workstation parameter module 18 is configured to define one or more workstations 110-1, 110-2, 110-3, 110-4, 110-5, 110-6, 110-7, 110-8, 110-9 (collectively referred to hereinafter as "workstations 110") of the digital twin 100 and one or more workstation parameters associated with the workstations 110. The one or more workstation parameters may include a cycle time and/or downtime associated with each workstation 110. In one form, the cycle time and/or downtime are arbitrarily or stochastically defined by an operator or defined based on empirical/historical cycle time/downtime data associated with the workstations of the manufacturing environment 50. Additionally, the one or more workstation parameters may include a type of workstation 110, a manufacturing operation performed at the workstation 110 (e.g., a pallet loading/unloading operation, a workpiece transformation operation, among others), robot parameters/mobility characteristics associated with one or more robots located at the workstation 110, conveyor/fixture operational characteristics, among other workstation parameters. As an example, the workstation parameters may indicate that a pallet unloading operation is performed at the workstation 110-7, a pallet loading operation is performed at the workstations 110-8, 110-9, and a workpiece transformation operation is performed at the remaining workstations 110-1, 110-2, 110-3, 110-4, 110-5, 110-6.

In one form, the manufacturing routine module 20 is configured to simulate a manufacturing routine of the pallets 104 and the workstations 110 based on the sensor layout of the sensors 108, the one or more pallet parameters, and the one or more workstation parameters. As an example, the manufacturing routine module 20 simulates the pallets 104 traversing from the routing control location 102-1 to a given destination, such as the workstation 110-7 (e.g., a storage location where the finished workpieces of the pallets 104 are unloaded) or the workstations 110-8, 110-9 (e.g., a storage location where unloaded pallets 104 are loaded with workpieces) via the one or more of the paths 106, one or more of the workstations 110, and one or more additional routing control locations 102 where the pallet merging/splitting operations are performed. In some forms, the manufacturing routine module 20 may perform known manufacturing simulation routines to simulate the manufacturing routine of the pallets 104 and the workstations 110.

In one form, the RL training module 10 includes a state module 32, an action module 34, a consequence state module 36, a transient production value (TPV) module 38, a steady state production value (SSPV) module 40, and a control model module 42. In one form, the state module 32, the action module 34, and the consequence state module 36 are collectively configured to perform a discrete-time stochastic control routine, such as a Markov decision process (MDP) routine.

In one form, the state module 32 is configured to obtain state information from the sensors 108 during the manufacturing simulation routine. The state information includes a number and/or type of pallets at the routing control locations 102 at one or more times of the manufacturing simulation routine. As an example, the state information indicates a discrete time value (T) of the manufacturing simulation, the routing control location 102, a number of pallets 104 that are classified as the first type ($x_1$) and a number of pallets 104 that are classified as the second type ($x_2$), as shown below in Table 1.

TABLE 1

| State Information - Routing Control Location 102-2 | | |
|---|---|---|
| Time | $x_1$ | $x_2$ |
| $T_0$ | 1 | 0 |
| $T_1$ | 1 | 1 |
| $T_2$ | 2 | 1 |

In one form, the action module 34 is configured to determine an action at the routing control locations 102 based on the state information. The actions include, for example, the pallet merging operation and the pallet splitting operation. In one form, the actions may be determined at each of the discrete time values, as shown below in Table 2.

TABLE 2

| Action - Routing Control Location 102-2 | |
|---|---|
| Time | Action |
| $T_0$ | Select and Merge Pallet 104-2 ($x_2$) |
| $T_1$ | Select and Merge Pallet 104-1 ($x_1$) |
| $T_2$ | Select and Merge Pallet 104-1 ($x_1$) |

In one form, the consequence state module 36 is configured to determine a consequence state at the routing control locations 102 based on the action. In one form, the consequence state information includes a number and/or type of pallets at the routing control locations 102 at the one or more times of the manufacturing simulation routine. As an example, the consequence state information indicates a consequent routing control location 102 associated with the action, a number of pallets 104 at the consequent routing control location 102 that are classified as the first type ($x_1'$) and a number of pallets 104 at the consequent routing control location 102 that are classified as the second type ($x_2'$), as shown below in Table 3.

TABLE 3

Consequence State - Routing Control Location 102-2

| Time | $x_1'$ | $x_2'$ |
|---|---|---|
| $T_0$ | 1 | 1 |
| $T_1$ | 2 | 1 |
| $T_2$ | 3 | 1 |

While Tables 1-3 illustrate the state information, action, and consequence state for the routing control location 102-2, it should be understood that tables illustrating the state information, action, and consequence state may be generated for each routing control location 102.

In one form, the TPV module 38 is configured to calculate a TPV of each routing control location 102 based on the consequence state and a transient objective function. The TPV corresponds to transient rewards of the simulated manufacturing routine at the given routing control location 102. In one form, when more than two types of pallets 104 exist (e.g., the pallets 104 can travel along n paths 106 to arrive at one of the routing control locations 102, where n>2), the TPV module 38 calculates the TPV for the routing control location 102 based on the following transient objective function:

$$TPV_{102} = -\left| \frac{d_1}{d_1 + d_2 + \dots d_n} - \frac{x_{1'}}{x_{1'} + x_{2'} + \dots x_{n'}} \right| \quad (1)$$

In transient objective function (1), $d_1$ is a first target production value associated with a first type of pallets 104, $d_2$ is a second target production value associated with a second type of pallets 104, and $d_n$ is an nth target production value associated with an nth type of pallets 104. The first, second, and nth target production values collectively form a production ratio that is based on the first production ratio and a sum of the first, second, and nth production ratios. As used herein, "target production value" refers to a number of pallets 104 of the given type that need to traverse from a defined origin (e.g., the routing control location 102-2) and the destination (e.g., the workstation 110-7) along the paths 106 to satisfy predefined time and/or production-based constraints.

In transient objective function (1) and as described above, $x_1'$ is the number of pallets 104 between the consequent routing control location 102 and the destination that are classified as the first type, $x_2'$ is the number of pallets 104 between the consequent routing control location 102 and the destination that are classified as the second type, and $x_n'$ is the number of pallets 104 between the consequent routing control location 102 and the destination that are classified as the nth type. Furthermore, in transient objective function (1), the numbers of the first and second types of pallets 104 ($x_1$ and $x_2$) collectively form a transient routing control location ratio that is based on the number of pallets 104 that are classified as the first type of pallets 104 ($x_1$) and a sum of the number of the first and second types of pallets 104. Furthermore, in transient objective function (1), the numbers of the first, second, and nth types of pallets 104 collectively form a transient routing control location ratio that is based on the number of pallets 104 that are classified as the first type of pallets 104 ($x_1$) and a sum of the number of the first, second, and nth types of pallets 104.

In one form, the SSPV module 40 is configured to calculate a SSPV of each routing control location 102 based on the consequence state and a steady state objective function. The SSPV corresponds to steady state rewards of the simulated manufacturing routine at the given routing control location and is represented as an objective function. In one form, when more than two types of pallets 104 exist (e.g., the pallets 104 can travel along n paths 106 to arrive at one of the routing control locations 102, where n>2), the SSPV module 40 calculates the SSPV for the routing control location 102 based on the following steady state objective function:

$$SSPV_{102} = -\left| \frac{d_1}{d_1 + d_2 + \dots d_n} - \frac{c_1}{c_1 + c_2 + \dots c_n} \right| \quad (2)$$

In steady state objective function (2), $c_1$ is a number of pallets 104 that are classified as the first type of pallets 104 that have passed through the given routing control location 102, $c_2$ is a number of pallets 104 that are classified as the the second type of pallets 104 that have passed through the given routing control location 102, and $c_n$ is a number of pallets 104 that are classified as the nth type of pallets 104 that have passed through the given routing control location 102. Furthermore, in steady state objective function (2), the numbers of the first, second, and nth types of pallets 104 collectively form a steady state routing control location ratio that is based on the number of pallets 104 that are classified as the first type of pallets 104 ($c_1$) and a sum of the number of the first, second, and nth types of pallets 104.

In one form, the control model module 42 is configured to selectively adjust one or more reinforcement parameters of the RL training module 10 based on the TPV and/or the SSPV. As an example, the control model module 42 is configured to determine whether the TPV and SSPV are less than a respective threshold value (i.e., a threshold TPV and a threshold SSPV). The threshold values for the TPV and SSPV may be equal or unequal. In one form, the threshold value for each of the TPV and the SSPV may be equal to (or approximately equal to) zero. Accordingly, comparing the TPV and the SSPV to the respective threshold enables the RL training module 10 to determine whether the reinforcement parameters of the RL training module 10 satisfy certain predefined production constraints.

In one form, when the control model module 42 determines that the TPV and/or the SSPV are less than the respective threshold value, the control model module 42 is configured to adjust one or more reinforcement parameters of the RL training module 10. The reinforcement parameters include, but are not limited to, the state information, the action, the sensor layout of the one or more sensors 108, the transient objective function, and/or the steady state objective function. The control model module 42 may iteratively adjust the reinforcement parameters until the TPV and the SSPV are less than the respective threshold values.

As an example, the control model module 42 is configured to iteratively adjust the sensor layout of the digital twin 100 (i.e., the number of sensors 108 and/or the placement of the sensors 108) until each TPV is less than or equal to a threshold TPV and each SSPV is less than or equal to the threshold SSPV. As an additional example, the sensor layout includes a predefined minimum number of the sensors 108, and the sensor layout is adjusted by adding one or more sensors 108 until a predefined maximum number of sensors 108 is reached. As another example, the control model module 42 is configured to adjust the threshold values of the transient objective function and/or the steady state objective function when the updated sensor layouts, state information, and/or action do not satisfy the time and/or production-based constraints associated with the transient and steady state objective functions.

As an additional example, the control model module 42 is configured to adjust the state information when the sensor layout is adjusted by adjusting the number and/or types of pallets 104 provided at one or more of the routing control locations 102 (e.g., the control model module 42 may increase or decrease the number and pathways in which the pallets 104 arrive and depart from the routing control location 102-1). As yet another example, the control model module 42 is configured to adjust the action performed by at least one of the pallets 104 at one or more of the routing control locations 102.

In one form, the control model module 42 determines that the NN-based control system 54 is trained when the TPV and/or the SSPV are less than the respective threshold value. When the control model module 42 determines that the NN-based control system 54 is trained, the control model module 42 may generate a state-action information correlation model (e.g., a deep neural network model) indicating, for each routing control location 102, an action associated with various state information. As an example and as shown below in Table 4, a state-action information correlation model for the routing control location 102-2 is shown. While various actions are shown for given example sets of state information, it should be understood that other sets of state information and actions may be included and are not limited to the examples provided in Table 4.

TABLE 4

State-action Information Correlation Model - Routing Control Location 102-2

| State | | |
|---|---|---|
| $x_1$ | $x_2$ | Action |
| 1 | 0 | Pallet Merging Operation (PMO) from $X_2$ |
| 1 | 1 | PMO from $X_1$ |
| 2 | 1 | PMO from $X_1$ |

In one form, the control model module 42 is configured to define a plurality of trained routes of the pallets 104 based on the state-action information correlation model of each routing control location 102. Specifically, the control model module 42 is configured to define the trained routes based on the action and state information defined in the state-action information correlation model of each routing control location 102. As an example, the control model module 42 identifies a first action associated with a first set of state information of routing control location 102-1, a second action associated with a second set of state information of routing control location 102-2, and additional actions associated with additional routing control locations 102 based on the state-action information correlation models. As such, the control model module 42 defines the route based on a path of a given pallet 104 associated with the first action, the second action, and the additional actions. It should be understood that the control model module 42 may define a trained route for each combination of state information/actions of the state-action information correlation models. Accordingly, the NN-based control system 54 may control the pallets 56 of the manufacturing environment 50 based on the state information obtained by the sensors 52 and the plurality of trained routes defined by the control model module 42.

Figure 4:
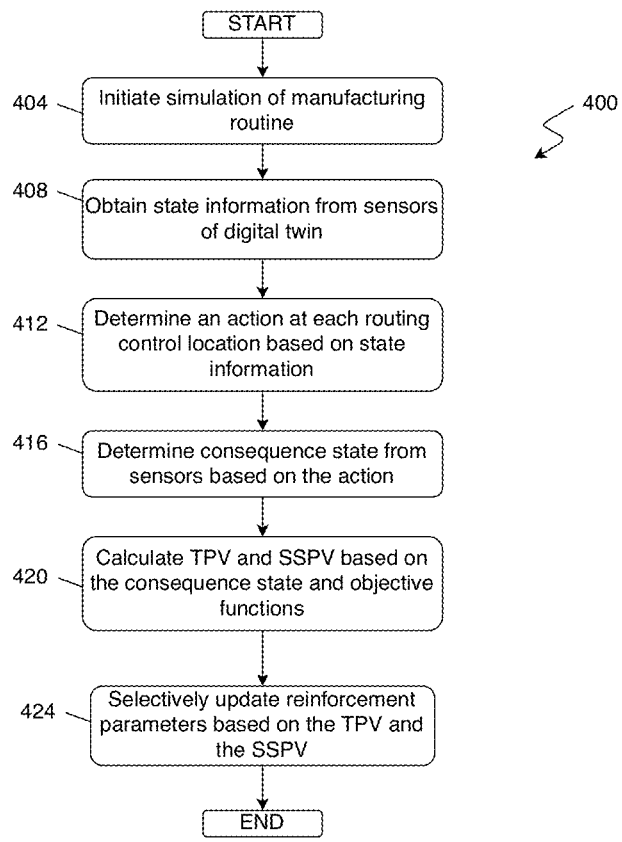
FIG. 4 illustrates a routine for training a reinforcement learning system in accordance with the teachings of the present disclosure.

Referring to FIG. 4, a routine 400 for training the NN-based control system 54 is shown. At 404, the RL training module 10 initiates a simulation of the manufacturing routine, and the RL training module 10 obtains state information from the sensors 108 of the digital twin 100 at 408. At 412, RL training module 10 determines an action at each routing control location 102 based on the state information, and the RL training module 10 determines a consequence state from the sensors and based on the action at 416. At 420, the RL training module 10 calculates the TPV and SSPV based on the consequence state, the transient objective function, and the steady state objective function, and the RL training module 10 selectively updates the reinforcement parameters based on the TPV and the SSPV at 424. Additional details regarding the selective updating of the reinforcement parameters are provided below with reference to FIG. 5.

Figure 5:
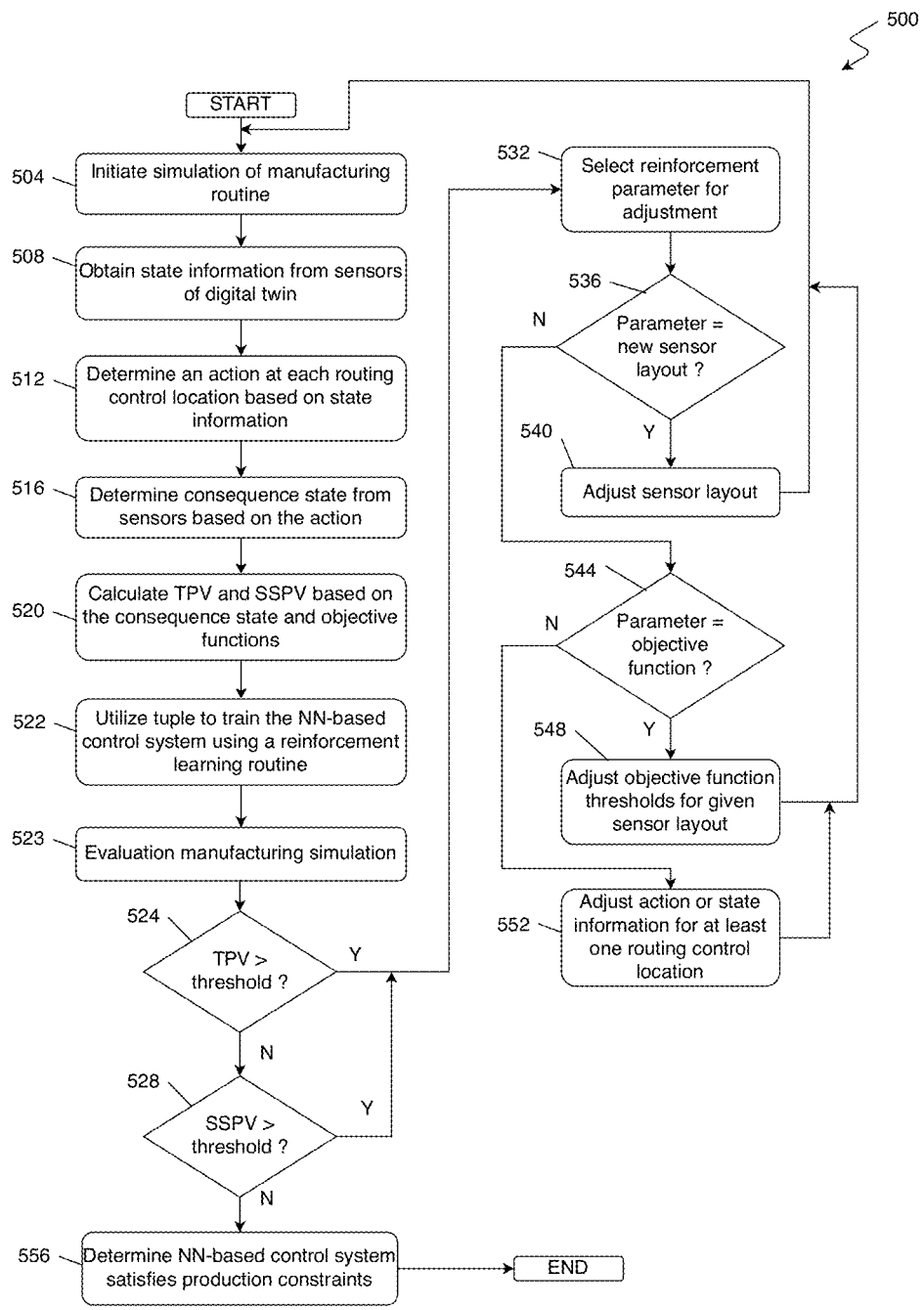
FIG. 5 illustrates another routine for training a reinforcement learning system in accordance with the teachings of the present disclosure.

Referring to FIG. 5, a routine 500 for training the NN-based control system 54 is shown. At 504, the RL training module 10 initiates a simulation of the manufacturing routine, and the RL training module 10 obtains state information from the sensors 108 of the digital twin 100 at 508. At 512, RL training module 10 determines an action at each routing control location 102 based on the state information, and the RL training module 10 determines a consequence state from the sensors and based on the action at 516. At 520, the RL training module 10 calculates the TPV and SSPV based on the consequence state, the transient objective function, and the steady state objective function.

At 522, the RL training module 10 utilizes the tuple (i.e., the state, action, consequence state, and the sum of the transient and steady state functions for each routing control location 102 where the sensors 108 are placed) to train the NN-based control system 54 using a reinforcement learning routine until training is ended. At 523, the RL training module 10 evaluates the manufacturing simulation using the trained model obtained at 522. At 524, the RL training module 10 determines whether the TPV is greater than a threshold TPV. If so, the routine 500 proceeds to 532. Otherwise, if the TPV is less than the threshold TPV at 524, the routine 500 proceeds to 528. At 528, the RL training module 10 determines whether the SSPV is greater than a threshold SSPV. If so, the routine 500 proceeds to 532. Otherwise, the routine 500 proceeds to 556, where the RL training module 10 determines the NN-based control system 54 satisfies the production constraints.

At 532, the RL training module 10 selects a reinforcement parameter to be adjusted, and at 536, the RL training module 10 determines whether the selected reinforcement parameter corresponds to a new sensor layout. If so, the RL training module 10 adjusts the sensor layout at 540 and then proceeds to 504. Otherwise, if the selected reinforcement parameter is not the sensor layout, the routine 500 proceeds to 544. At 544, the RL training module 10 determines whether the selected reinforcement parameter corresponds to an adjustment of one of the objective function thresholds. If so, the RL training module 10 adjusts the steady state and/or transient objective function thresholds at 548 and then proceeds to 504. Otherwise, if the selected reinforcement parameter is not one of the objective function thresholds, the routine 500 proceeds to 552, where the RL training module 10 adjusts the action and/or state information for at least one of the routing control locations 102 and then proceeds to 504.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for training a reinforcement learning system, the method comprising:
   obtaining state information from one or more sensors of a digital twin, wherein the state information includes a number of a plurality of pallets at a first routing control location of the digital twin during a manufacturing simulation, a type of the plurality of pallets at the first routing control location during the manufacturing simulation, or a combination thereof;
   determining an action at the first routing control location based on the state information, wherein the action includes one of a pallet merging operation and a pallet splitting operation;
   determining a consequence state based on the action, wherein the consequence state includes a consequent number of the plurality of pallets at a consequent routing control location of the digital twin, a type of the plurality of pallets at the consequent routing control location, or a combination thereof;
   calculating a transient production value based on the consequence state and a transient objective function;
   calculating a steady state production value based on the consequence state and a steady state objective function; and
   selectively adjusting one or more reinforcement parameters of the reinforcement learning system based on the transient production value and the steady state production value.

2. The method of claim 1, wherein the one or more reinforcement parameters include a sensor layout of the one or more sensors, the transient objective function, the steady state objective function, or a combination thereof.

3. The method of claim 2, wherein selectively adjusting the one or more reinforcement parameters includes adjusting the sensor layout, and wherein adjusting the sensor layout further comprises changing a number of the one or more sensors in the digital twin, a placement of the one or more sensors in the digital twin, or a combination thereof.

4. The method of claim 3 further comprising adjusting a threshold transient production value of the transient objective function of the adjusted sensor layout, a threshold steady state production value of the steady state objective function of the adjusted sensor layout, or a combination thereof.

5. The method of claim 1, wherein the one or more reinforcement parameters includes the state information, the action, or a combination thereof.

6. The method of claim 1, wherein the transient objective function and the steady state objective function are based on a first target production value associated with a first type of pallets from among the plurality of pallets and a second target production value associated with a second type of pallets from among the plurality of pallets.

7. The method of claim 6, wherein the transient objective function is based on a ratio between a first number of the first type of pallets and a second number of the second type of pallets located at the consequent routing control location.

8. The method of claim 6, wherein the steady state objective function is based on a ratio between a first number of the first type of pallets and a second number of the second type of pallets located between the consequent routing control location and a destination.

9. The method of claim 6, wherein the transient objective function and the steady state objective function are based on a production ratio that is indicative of a ratio of the first target production value and a sum of the first target production value and the second target production value.

10. A system for training a reinforcement learning system, the system comprising:
    a processor; and
    a nontransitory computer-readable medium including instructions that are executable by the processor, wherein the instructions include:
      obtaining state information from one or more sensors of a digital twin, wherein the state information includes a number of a plurality of pallets at a first routing control location of the digital twin during a manufacturing simulation, a type of the plurality of pallets at the first routing control location during the manufacturing simulation, or a combination thereof;

determining an action at the first routing control location based on the state information, wherein the action includes one of a pallet merging operation and a pallet splitting operation;

determining a consequence state based on the action, wherein the consequence state includes a consequent number of the plurality of pallets at a consequent routing control location of the digital twin, a type of the plurality of pallets at the consequent routing control location, or a combination thereof;

calculating a transient production value based on the consequence state and a transient objective function;

calculating a steady state production value based on the consequence state and a steady state objective function; and selectively adjusting one or more reinforcement parameters of the reinforcement learning system based on the transient production value and the steady state production value, wherein the transient objective function and the steady state objective function are based on a first target production value associated with a first type of pallets from among the plurality of pallets and a second target production value associated with a second type of pallets from among the plurality of pallets.

11. The system of claim 10, wherein the one or more reinforcement parameters include a sensor layout of the one or more sensors, the transient objective function, the steady state objective function, or a combination thereof.

12. The system of claim 11, wherein the instructions for selectively adjusting one or more reinforcement parameters include adjusting the sensor layout, and wherein adjusting the sensor layout further comprises changing a number of the one or more sensors in the digital twin, a placement of the one or more sensors in the digital twin, or a combination thereof.

13. The system of claim 12, wherein the instructions further comprise adjusting a threshold transient production value of the transient objective function of the adjusted sensor layout, a threshold steady state production value of the steady state objective function of the adjusted sensor layout, or a combination thereof.

14. The system of claim 11, wherein the one or more reinforcement parameters includes the state information, the action, or a combination thereof.

15. The system of claim 10, wherein the transient objective function is based on a ratio between a first number of the first type of pallets and a second number of the second type of pallets located at the consequent routing control location.

16. The system of claim 10, wherein the steady state objective function is based on a first number of the first type of pallets and a second number of the second type of pallets located between the consequent routing control location and a destination.

17. The system of claim 10, wherein the transient objective function and the steady state objective function are based on a production ratio that is indicative of a ratio of the first target production value and a sum of the first target production value and the second target production value.

18. A method for training a reinforcement learning system, the method comprising:

obtaining state information from one or more sensors of a digital twin, wherein the state information includes a number of a plurality of pallets at a first routing control location of the digital twin during a manufacturing simulation;

determining an action at the first routing control location based on the state information, wherein the action includes one of a pallet merging operation and a pallet splitting operation;

determining a consequence state based on the action, wherein the consequence state includes a consequent number of the plurality of pallets at a consequent routing control location of the digital twin, a type of the plurality of pallets at the consequent routing control location, or a combination thereof;

calculating a transient production value based on the consequence state and a transient objective function;

calculating a steady state production value based on the consequence state and a steady state objective function; and selectively adjusting one or more reinforcement parameters of the reinforcement learning system based on the transient production value and the steady state production value, wherein the one or more reinforcement parameters include a sensor layout of the one or more sensors, the transient objective function, the steady state objective function, or a combination thereof, and wherein the transient objective function and the steady state objective function are based on a first target production value associated with a first type of pallets from among the plurality of pallets and a second target production value associated with a second type of pallets from among the plurality of pallets.

19. The method of claim 18, wherein selectively adjusting one or more reinforcement parameters includes adjusting a threshold transient production value of the transient objective function of the adjusted sensor layout, a threshold steady state production value of the steady state objective function of the adjusted sensor layout, or a combination thereof.

20. The method of claim 18, wherein the one or more reinforcement parameters includes the state information, the action, or a combination thereof.

* * * * *